Aug. 31, 1954     J. F. MARCHAND     2,687,997
DIALYZERS
Filed Dec. 10, 1949
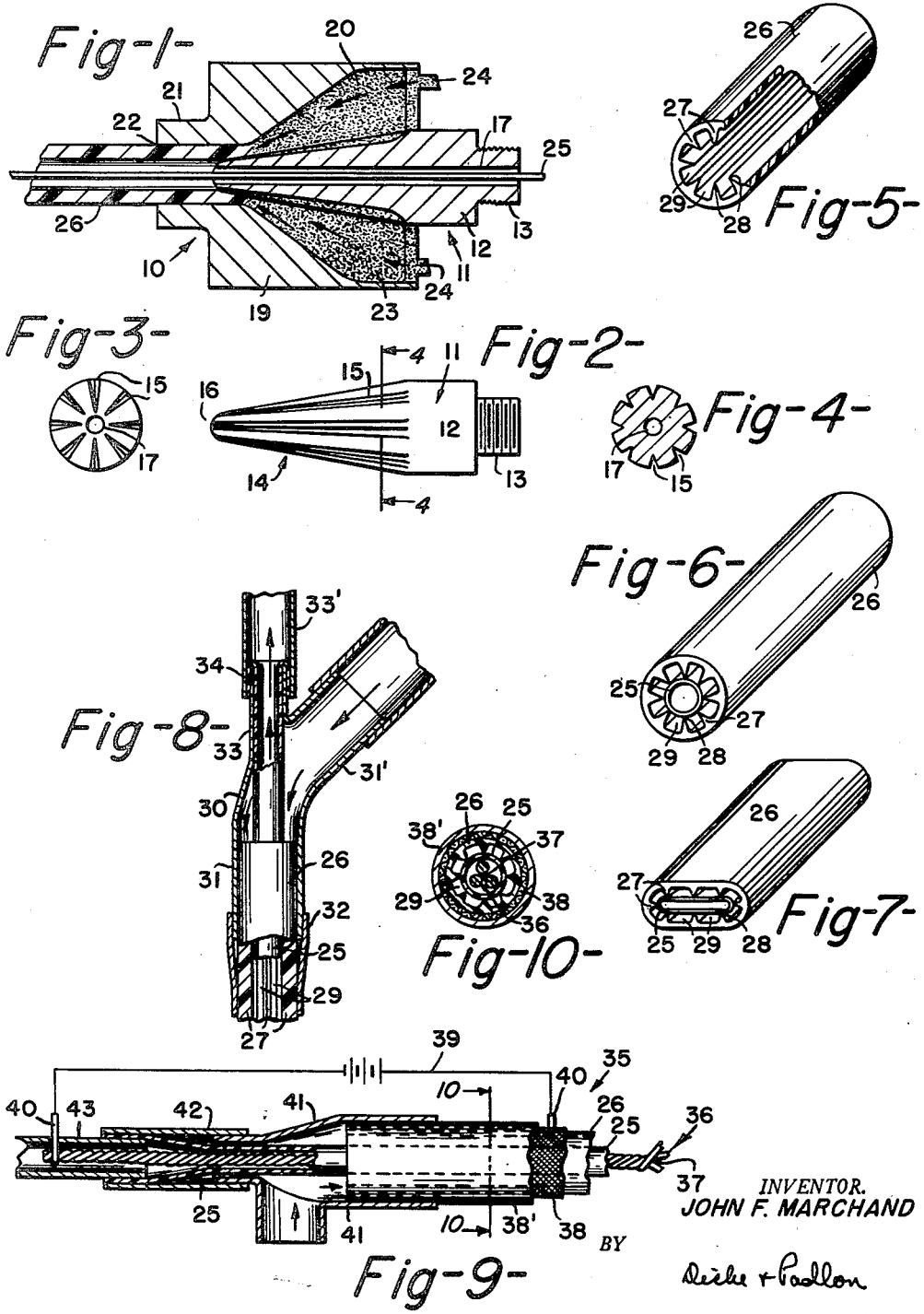
INVENTOR.
JOHN F. MARCHAND
BY Dicke + Paollon
ATTORNEYS Patented Aug. 31, 1954

2,687,997

UNITED STATES PATENT OFFICE 2,687,997

DIALYZERS

John Felix Marchand, New York, N. Y.

Application December 10, 1949, Serial No. 132,264

5 Claims. (Cl. 210—8.5)

This invention relates to dialyzers, and more particularly to a tubular, flexible, multiribbed dialyzing device, and means for making the same.

In my copending application, Serial Number 112,037, filed August 24, 1949, now Patent No. 2,664,395, I have described, illustrated, and claimed novel types of dialyzers, illustrating their features, uses, and applications. Dialysis is the passage of diffusible ions or molecules through a selectively permeable intervening septum from one gaseous or liquid solution or mixture into another. The process is used in industry and in the laboratory for a variety of separations and purifications, depending on differences in diffusion coefficients of the component substances. Heretofore, small batches of liquids or gases have been customarily dialyzed in permeable membranous bags immersed in a surrounding bath. For large quantities of materials to be separated by diffusion a continuous-flow process is preferable. Apparatus for large-scale dialysis is exemplified by the cast-iron filter-press type dialyzers employed in the recovery of caustic soda from cellulose-treating solutions. The manufacture and servicing of these large cumbersome dialyzers is time consuming, laborious, and costly.

Tubular dialyzers of one or more membranous tubes in a rigid outer vessel have been practically applied to a limited degree. However, there has been no fully satisfactory means for holding tubular membranes in proper alignment for optimum operating efficiency, nor has a convenient, low cost, disposable, flexible tubular dialysis assembly heretofore been available.

In dialyzers of the prior art, notably filter-press type dialyzers, the dialysis membranes are supported at fixed edges. These points of support are subjected to strain as the membranes shrink, swell, or billow. The membranes frequently rupture or tear along these lines, or are sawed through by the supporting edges. Furthermore, except for tubular dialyzers, which lack means for holding the membranes in proper alignment, none of the continuous dialyzers heretofore in use are free of frictional resistance to flow in both the inner and outer circuits as a result of contact of the flowing streams with side walls, corners, grids, or other structures. The pressure gradients resulting from such friction limit dimensions and enhance the difficulty of holding delicate membranes in place without danger of rupture.

With the above in view, it is an object of my invention to overcome these and other disadvantages in the prior methods and equipment for continuous direct or countercurrent dialysis.

Another object of my invention is to provide a highly efficient but easily made and readily disposable tubular continuous dialyzer of novel design.

Another object of my invention is to provide novel means for manufacturing a novel type of tubular continuous type dialyzer.

Other objects and features of my invention will become apparent from the hereinafter detailed description and accompanying drawings, in which Fig. 1 is a preferred embodiment of the means used for making a novel tubing according to my invention;

Fig. 2 is a longitudinal side view of a portion of one of the elements of the embodiment shown in Fig. 1;

Fig. 3 is a view looking toward the tapering end of the element shown in Fig. 2;

Fig. 4 is a sectional view looking in the direction of the arrows and taken on line 4—4 of Fig. 2;

Fig. 5 is a perspective, partially sectionalized view of a novel tubing forming part of and made according to my invention and showing some of the details thereof;

Fig. 6 is a perspective view of the embodiment shown in Fig. 5 containing a concentric inner tubular member;

Fig. 7 is a flattened form of the embodiment in Fig. 6;

Fig. 8 is a sectional view of an assembly showing the invention as used with an adapter Y tube;

Fig. 9 is a sectional view of another form of the invention used as an electrodialyzer; and Fig. 10 is a cross-section on line 10—10 of Fig. 9.

Referring now to the drawings in which similar reference characters refer to like parts throughout, there is provided according to my invention, an extruder assembly 10 for plastic and similar material. Said assembly contains a screw extruder die member 11 having a rear body portion 12 with a threaded connecting end 13. The die member 11 has a forward tapering portion 14 provided with several suitably spaced V-shaped grooves 15 cut longitudinally along the surface of the tapering portion 14. These grooves 15 are wider and deeper at the base end than at the taper end of this die. It will be noted that the grooves 15 are all of equal peripheral width. They converge toward the longitudinal axis of the tapering portion and toward the extruding tip 16 of die 11. At the extruding tip 16 of die 11 the edges of the grooves 15 form a sharp angle defining the shape of the beads or fins of the interior of the resultant product to be hereinafter described in greater detail. The die member 11 is further provided with a continuous axial opening or channel 17 for permitting the passage therethrough of a tubular or similar type of membrane 25 during the manufacture of one of the dialyzer members. The extruder die 11 is mounted in any suitable manner to a delivery head 19 which is provided with a reservoir 20 into which extends the tapering portion 14 of the die 11. The delivery head 19 is provided with an extruder nozzle 21 whose opening 22 is in axial alignment with the longitudinal channel 17 of the die 11. The extruder die 11 is set inwardly of the delivery head 19, as shown in Fig. 1, so as to permit hot plastic material 23 in reservoir 20 to pass out and take shape as it cools at the extruder nozzle 21. The plastic material is fed into reservoir 20 of delivery head 19 through inlets 24, of which there may be any suitable number, at conveniently spaced locations.

In the use of the extruder assembly 10 to make dialyzers according to my invention, a mass of hot plastic material 23, such as polyethylene, Vinylite, vinyl butyrate, nylon, or rubber, is forced under pressure into reservoir 20. The reservoir operating temperatures and the die dimensions are adapted to the known expansion properties and temperature requirements of the flux to be extruded. At the same time there is continuously passed through the longitudinal central channel 17 of die 11 a permeable membranous flexible or flaccid tube 25, such as cellophane, parchment, and the like, from a spool or other source (not shown) in such a manner that it merges at die tip 16 and comes to lie within the lumen of the outer tube 26 throughout its length. By "flaccid" tube is meant a tube which is normally flabby or one which lacks firmness. In this manner, there is formed an internally beaded outer tube 26 extruded around a permeable inner tube 25 to produce by a continuous-flow process a counter-current dialyzer which may be put to use as soon as it has been cut to the desired lengths and provided with suitable fluid or gas connections at the ends. In my preferred method, the dialyzer assembly is passed between rollers, or otherwise partially flattened while still hot and plastic as it emerges from the extruder nozzle 21. This partial flattening diminishes or eliminates dead space within the innermost tube 25, and also makes the finished dialyzer easier to wind on a spool for convenience during use or compactness in storage or transit.

The grooves 15 on die 11 cause the extruded outer tube or casing of the dialyzer to emerge with a number of longitudinal beads or fins 27 on the inner surface of the outer tube 26. The optimum number and dimensions of these beads or fins 27 in any particular application is determined by the size of the outer tube 26 and the relation of this size to the dimensions of an inner tube around which this outer tube is extruded. These novel longitudinal beads or fins 27 have narrow edges or crests 28 which touch or almost touch the inner tube 25 and serve to hold the inner tube very gently but precisely in place. An additional function of the longitudinal beads or fins 27 as applied in this invention is to define several longitudinal channels 29 between the inner surface of the outer tube 26 and the outer surface of the inner tube 25. The depth of the grooves 29 between the beads 27 is made sufficient to permit the inner tube 25 to stretch and herniate part way into the outer grooves as they swell and stretch during use. The remaining depth of these grooves is then still sufficient to permit the apparatus to operate with efficiency and without obstruction or partial obstruction of the groove channels. Furthermore, these groove channels 29 are made too narrow and rounded to permit the inner tube to get caught and crowded between the beads. During use, the membranous wall of the inner tube is held in alignment against the longitudinal beads or fins and the channels between them either by internal gaseous or hydrostatic pressure or by a spring grid within the inner tube. The longitudinal beads or fins 27 must have a narrow edge or crest which is not sharp enough to cut the delicate inner tube which they support, yet fine enough to make the narrowest possible contact with this inner tube. By angulating the grooves 15 with respect to the long axis and rotating the die 11 during extrusion, these beads 27 may be disposed in a spiral to lengthen the outer circuit.

The extruded outer tube or casing 26 is made heavy enough to be leakproof and is flexible but tough enough to serve, among other purposes, as protection from accidental damage for the fragile inner dialyzing membrane 25. This casing 26 is preferably made of a relatively insoluble, translucent, chemically inert, non-toxic material, such as polyethylene. This outer tube 26 is made just heavy and stiff enough to prevent buckling or kinking.

In the embodiment shown in Fig. 8, there is provided a novel adapter-fitting assembly 30 for connecting to the inner and outer tubes 25 and 26 respectively of the tubular dialyzer. This adapter 30 may be a rigid or flexible, preferably transparent, Y tube. The stem 31 of this Y tube fits snugly by a screwed or overlapped and tape-sealed connection 32 over the end of the outer tube or casing 26. The stem 31 together with the branch 31' of this Y tube is approximately as large in diameter as the tube 26, and serves as a distributing manifold, permitting a flow of the same pressure to or from all the outer channels 29 between the beads or fins. In the rigid form, for example in glass or metal, the axial branch 33 of this Y tube 30 is made with an external diameter very slightly smaller than that of the inner membranous tube 25. The end of the inner membranous tube is drawn through this axial branch 33, and folded back around the edges to be held firmly in a leak-proof connection by a flexible tube 34 of rubber or plastic fitted over this branch. On the other hand, if this Y member 30 is made flexible, as of rubber or polyvinylite, then the end of the inner membrane tube which has been drawn through the axial branch of the Y, as above, is next drawn like a stocking over the smooth end of a glass or metal or other fairly solid tube used for connecting to the inner circuit. In the latter case this solid tube connection is then forced into the membranous tube far enough to force the outer surface of this inner membranous tube tightly against the elastic inner wall of the Y tube branch 34 to form a liquid or gas-tight seal. Whether the Y shaped end-fitting 30 is flexible or rigid, it is made with the axial branch 34 of the Y member in the same axis as the stem 31 in order to avoid buckling or pinching the flexible inner membranous tube 25 as it passes through the end-fitting.

If the dialyzer is to be operated under conditions such that the hydrostatic pressure in the inner tube 25 is not always above that of the outer circuit in the outer tube 26 the inner membrane tube must be extruded or mounted around an inner supporting element or grid, preferably a spring grid comprising a fine wire spiral, or one of the spring grids as specified in the copending application Serial Number 112,037, filed August 24, 1949. Whenever possible, however, it is desirable to omit such a grid in order to leave as much as possible of the membrane surface free for dialysis, and to limit all frictional resistance in the inner circuit to that arising from contact with the dialyzing membrane itself.

As a modification of my invention hereinabove described and illustrated, I provide an electrodialyzer assembly 35, as shown in Fig. 9 of the accompanying drawings. In this assembly there is provided an inner supporting core 36 within flexible inner tube 25 of dialysis-membrane. This core 36 is made wholly or partly of metal or other electrically conducting material. An outer covering or winding 38 of metallic foil or wire or other suitable conducting material is provided which is incorporated within the outer tube or casing 26 or is applied around it. It will be noted that an electrical conducting, longitudinally or spirally grooved or corrugated metal tube may be employed as the outer tube or casing (26) of the dialyzer assembly and that two or more twisted wires may serve as the supporting element 36 within the lumen of the flexible inner dialysis tube 25. The grooves defined by the twisted wires 36 forming the inner core serve as channels conducting the inner dialyzing stream in a path in intimate contact with the membranous walls of the tubular dialyzing membrane 25, and these wires are therefore twisted around a soft inner strand 37 of rubber or plastic which fills all the space between these wires except the spiral grooves through which the streams are to run.

The outer electrical pole or layer 38 may be applied as a metallic coat or winding around the outer beaded tube or casing 26 of the dialyzer, either during or after the extrusion of the internally beaded tube and its contents. However, for the greatest economy and simplicity in manufacture and use, it is preferred that the internally beaded tube 26 of the dialyzer be itself made an electrical conductor. This is accomplished by mixing threaded or particulate conducting material, such as carbon or metal, into the liquid matrix which is to be extruded, or by electroplating the beaded tube, or by otherwise depositing on the surface of the extruded tube 26 a film of metal or other good electrical conductor.

In the preferred embodiment shown in Fig. 9 and Fig. 10, it will be noted that innermost soft rubber or plastic filament 37 about which strands of metal wire 36 are wound helps define several spiral grooves or crevices through which the innermost dialyzing solution is to flow. Around this spirally-grooved, electrically-conducting, flexible membrane support is extruded the flexible, transparent, seamless, selectively permeable, tubular dialyzing membrane 25, which conducts the innermost of the solutions to be dialyzed. Around this permeable inner tube and its contents is extruded an internally beaded, flexible, transparent or translucent outer tube or casing 26. The straight longitudinal beads 27 of the outer tube cannot encroach within or obstruct the channels within the inner tube because the channels within the inner tube are in a spiral. Around this outer tube 26, which may be of polyethylene, is wound a strand of metallic wire 38 between the coils of which it is possible to see through the translucent outer case and observe thereby whether the channels inside are properly filled and free of bubbles. An electrically insulating layer 38' of transparent varnish or plastic is applied or extruded over the outer surface of this electrodialyzer.

An electrical circuit 39, either A. C. or D. C., is provided by means of a wire connection to the outer conducting layer 38, and to the inner conducting core 36 by a terminal 40 through the wall of the inlet or outlet tube connecting with the inner channels. The modified embodiment is provided with a T tube 41, preferably made of glass. This T tube is adapted as an end-fitting to permit easy connections for the core 36, outer casing 26, conductor 38 and insulation 38'. In this construction, glass has desirable physical and chemical properties and permits visual observation. A flexible rubber or plastic tubing section 42 is provided for interconnecting the tube 25 and a glass connector tube 43.

When this device is operated as an electrodialyzer, a potential difference is set up between the inner and outer electrical elements. This difference in electrical potential causes ions or electrically charged molecules to diffuse in a predominantly axial or radial direction, depending on the sign of their respective electrical charges, by a process known as electrophoresis. The direction and magnitude of the potential difference so applied may therefore be used to encourage or accelerate dialysis selectively with respect to substances of differing electrical charges. When the inner and outer electrical elements are connected to an ordinary reciprocating alternating current source, sustained electrophoresis in one direction does not occur, but diffusion in both directions to the point of equilibrium is accelerated by the alternating forces which result from the reciprocating fields so established. Electrodialysis by alternating current is applicable to many of the procedures ordinarily accomplished by simple dialysis and so enhances the efficiency of the process that a smaller dialysis device may be employed to accomplish the same task in a shorter time. Electrodialysis by direct current is applicable to the separation of ions or molecules of differing electrical charge. This separation is accomplished by electrophoresis through a semipermeable membrane. When the solution in the inner or outer circuit is capable of conducting electricity, the electrical connection may be made directly to the solution, with the result that the inner or outer electrical elements 36 or 38 may be omitted.

In the application of a dialyzer described herein and made according to my invention, solutions or gases to be dialyzed enter one end of the innermost tube and flow through in the opposite direction to that of the outer streams of gas or solution against which the innermost stream is being dialyzed. The outermost streams pass through the channels between the longitudinal beads or fins in the outer tube. The two systems of liquids or gases are therefore separated from one another by the semi-permeable or selectively permeable wall of the innermost tube. Although this inner tubular membrane may be rigid or opaque in special applications, there are evident advantages to the preferred embodiments of my invention employing a flexible, transparent inner membrane, for example, cellulose or a cellulose derivative. During the passage of these innermost and outermost streams over the inner and outer surfaces of the inner tube, those substances which can diffuse through the membrane, pass from one solution to the other at rates depending on their respective chemical and physical properties and their thermal kinetic activities. This diffusion process approaches completion or equilibrium when the tubular dialyzer is made sufficiently long as a unit or as a series of units, or when the solutions or gases under treatment are recirculated through a relatively short section of such a dialyzer. The efficiency or completeness with which this dialyzer achieves equilibrium is therefore dependent, in part, on its length. The capacity of the system, on the other hand, is determined by the number of such units operated in parallel. The ease with which the simple flexible units of this dialyzer assembly may be connected or disconnected by ordinary methods permits easy installation and convenient adjustment of the efficiency and capacity of such a system to the needs of the moment.

From the foregoing description taken in connection with the accompanying drawings, it will be noted that I provide a dialyzer assembly and method of making and using same comprising an extruded, flexible, translucent, compact, lightweight, easily-connected, easily-operated, strong, microfilm dialyzer unit. This dialyzer is workable as a unit or as an assembly of standardized units which may conveniently be discarded after use or damage and replaced from spare stocks on hand, as needed. The parts of this dialyzer include a tough but flexible, chemically inert, translucent, extruded outer tube or casing and novel end-fittings for connecting to the inner and outer circuits of this continuous counter-current dialyzer.

A novel, extruded, tubular dialyzer is provided by my invention having an efficiency in operation beyond that attainable with prior types of equipment made possible by the fact that, in this new design, the counter-current streams to be equilibrated against one another by passage over a semipermeable membrane may be made very shallow. This important microfilm feature, which is not available in prior types of dialyzers, eliminates dead space and provides a very steep concentration gradient favorable to rapid diffusion and an early attainment of diffusion-equilibrium across the membrane. The unusually small or shallow streams which may be conducted over the dialyzing membrane by this device are made possible by the fact that it is practicable to make the entire assembly either very small and narrow, or large but flattened.

This microfilm feature is an important advance in dialyzer design in more than one respect. In reducing or eliminating dead space, meaning space where the stream is not in intimate contact with the membrane, it reduces or eliminates the tendency of part of the stream to pass through without reaching the membrane at all. In this novel microfilm dialyzer, the usual eddy currents and back diffusion between dialyzed and not yet dialyzed portions of the stream are minimized by the narrowness of the dimensions involved. Steeper concentration gradients and more rapid diffusion across the membranes are therefore made possible because the dialyzed portions of the stream are not allowed to mix with the portions of the stream which have not yet been dialyzed.

An important advantage of this dialyzer is that in the inner circuit frictional resistance to flow is limited to that resulting from contact of the stream with the dialyzing membranes themselves.

Another advantage of major importance in this invention is the provision of a means of supporting the membranes gently in a way that permits swelling, shrinking, and billowing, or great strain with a greatly diminished risk of rupture.

Furthermore, the microfilm dimensions and streamlined configuration of the inner and outer channels of a dialyzer made according to my invention facilitate the washing through of bubbles or particles to a remarkable degree. The temperature and other conditions of manufacture are such that this dialyzer is made bacteriologically sterile and ready for use with fermentable solutions.

Among special applications of my invention, by way of illustration, the dialyzer described is conveniently and readily effective in permitting the gradual addition of reagents from one solution to another without the formation of high concentrations of the added reagent at any one point. An example of such a step done according to my invention is the addition of an acid to a protein solution to lower the pH value without denaturing portions of the protein solution. Also, protein solutions may be readily concentrated by dialysis according to my invention against dry air or other dehydrating agents. By concentrating proteins in this way, foaming is avoided, thereby avoiding foam denaturation of such protein.

The cited application to protein chemistry is given as an example of the numerous and varied uses which will be clear and evident to persons skilled in the art of dialysis.

This dialyzer invention is designed for adaptability, with proper modifications, to any or all of the general or special applications of the processes of dialysis and electrodialysis in batch or continuous operations.

It will be noted that the construction shown and described serves to accomplish the objects stated above. It is to be understood, however, that the construction disclosed above is intended merely as illustrative of the invention and not as limiting, as various modifications therein may be made without departing from the invention as defined by a proper interpretation of the claims which follow.

I claim:

1. A dialyzer comprising in combination permeable inner tubular means, and a non-permeable outer member surrounding said inner means, said outer member containing a plurality of inner longitudinally extending grooves parallel with the axis of the tubular means and having radially extending walls forming fins for making contact with the surface of said permeable inner means, said outer member permitting the flow through the grooves of a washing stream in a manner counter to the flow of the diffusable material in the inner means.

2. A flexible dialyzer adapted to cleanse fluids containing diffusible material, said dialyzer comprising an outer non-permeable cylindrical member containing a plurality of longitudinal groove sections forming inner radially extending walls with fins adapted to carry wash means therethrough, and a flexible central axial cylindrical permeable member extending the length of the non-permeable member for carrying diffusible fluids therethrough, said permeable member forming point contacts with the ends of the fins of the outer member, said sections being parallel with the axis of the permeable member.

3. A dialyzer according to claim 2 in which the inner and outer members may be tubular and flattened.

4. A coaxial, compact, flexible, counter current dialyzer comprising a continuous inner membranous tube and a concentric outer impermeable tube having a series of successive, continuous, longitudinal grooves forming ribs arranged circularly therein having radially, internally extending tapering flat ends running short of the longitudinal axis of the tube and forming a surface adapted to form contact with the inner membranous tube, said longitudinal grooves with the inner tube forming longitudinal, successive circularly arranged channels, said inner tube when used being distended and pressing against the extending ends of said sections.

5. A dialyzer according to claim 4, in which the inner and outer tubes may be flattened without the ends of the fluted sections losing contact with the inner tube when in operation.

References Cited in the file of this patent

UNITED STATES PATENTS

| Number | Name | Date |
|---|---|---|
| 1,069,674 | Christy | Aug. 12, 1913 |
| 2,225,024 | Weber | Dec. 17, 1940 |
| 2,276,986 | Kemp et al. | Mar. 17, 1942 |
| 2,277,091 | Feyens | Mar. 24, 1942 |
| 2,411,239 | Reichel et al. | Nov. 19, 1946 |
| 2,479,804 | Bailey et al. | Aug. 23, 1949 |
| 2,502,614 | Zender | Apr. 4, 1950 |